United States Patent
Wen

(10) Patent No.: US 9,307,473 B2
(45) Date of Patent: Apr. 5, 2016

(54) METHOD AND APPARATUS FOR SWITCHING BETWEEN DIFFERENT NETWORK STANDARDS

(75) Inventor: Yongming Wen, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 906 days.

(21) Appl. No.: 13/578,632

(22) PCT Filed: Nov. 15, 2010

(86) PCT No.: PCT/CN2010/078723
§ 371 (c)(1),
(2), (4) Date: Aug. 13, 2012

(87) PCT Pub. No.: WO2012/006839
PCT Pub. Date: Jan. 19, 2012

(65) Prior Publication Data
US 2012/0315900 A1 Dec. 13, 2012

(30) Foreign Application Priority Data

Jul. 15, 2010 (CN) .......................... 2010 1 0230925

(51) Int. Cl.
*H04W 36/36* (2009.01)
*H04W 36/24* (2009.01)
*H04W 36/14* (2009.01)

(52) U.S. Cl.
CPC ............ *H04W 36/245* (2013.01); *H04W 36/14* (2013.01); *Y02B 60/50* (2013.01)

(58) Field of Classification Search
CPC ...... H04W 36/36; H04W 48/18; H04W 88/06
USPC ........... 455/435.1, 435.2, 435.3, 552.1, 553.1
See application file for complete search history.

(56) References Cited

U.S. PATENT DOCUMENTS

| | | | | |
|---|---|---|---|---|
| 2007/0165583 A1* | 7/2007 | Pecen | ................. | H04W 36/245 370/338 |
| 2011/0105102 A1* | 5/2011 | Jutzi | ................. | H04W 52/0229 455/419 |

FOREIGN PATENT DOCUMENTS

| | | |
|---|---|---|
| CN | 1274252 A | 11/2000 |
| CN | 101005711 A | 7/2007 |
| CN | 101299834 A | 11/2008 |
| WO | 2009059544 A1 | 5/2009 |

OTHER PUBLICATIONS

International Search Report in international application No. PCT/CN2010/078723, mailed on Apr. 28, 2011.
English Translation of the Written Opinion of the International Search Authority in international application No. PCT/CN2010/078723, mailed on Apr. 28, 2011.

* cited by examiner

Primary Examiner — Christopher M Brandt
(74) Attorney, Agent, or Firm — Oppedahl Patent Law Firm LLC

(57) ABSTRACT

The disclosure provides a method for switching between different network standards, which includes the following steps performed by a terminal: when switch is to be performed, sorting in a history record target cells corresponding to a source cell which the terminal is leaving, to form a search list, choosing the target cell from the search list and accessing the target cell. The disclosure further provides an apparatus for switching between different network standards. By means of the method and the apparatus of the disclosure, the rate of the switching between the different network standards is increased, the user experience is improved and the power consumption of the terminal is reduced.

10 Claims, 3 Drawing Sheets

METHOD AND APPARATUS FOR SWITCHING BETWEEN DIFFERENT NETWORK STANDARDS

TECHNICAL FIELD

The disclosure relates to the field of wireless communication network switching, particularly to a method and an apparatus for switching between different network standards.

BACKGROUND

With the development of a modern wireless communication technology, more and more network standards are used extensively. For example, the network standards which are commonly used currently include: a Global Systems for Mobile communications (GSM), a Wideband Code Division Multiple Access (WCDMA), a High Speed Packet Access (HSPA) technology, a Code Division Multiple Access (CDMA) 2000, a Evolution Data Only (EVDO), a Worldwide Interoperability for Microwave Access (WiMAX), the Long Term Evolution (LTE) and the like.

Among the numerous network standards, some have developed interconnection standards which can realize a dual-mode switching between the different network standards, that is, the switching is performed between the different network standards without affecting use of a user; for example, the LTE has developed the interconnection standards with network standards such as the HSPA, the EVDO and the like. However, many network standards, for various reasons, have not developed the interconnection standards, or their interconnection standards are still in an initial development stage and cannot be used commercially, therefore the dual-mode switching between any different network standards cannot be realized; for example, there is no commercially-available interconnection standard between the WiMAX and the EVDO, so the dual-mode switching cannot be performed between the WiMAX and the EVDO.

If there is no interconnection standard, i.e., without a support of a dual-mode switching standard, a terminal working under two network standards will switch very slowly between the two network standards; for example, an existing terminal has been able to work under such the two network standards as the WiMAX and the EVDO respectively; when a terminal needs to roam from an area covered by an EVDO network to an area covered by a WiMAX network, due to the lack of the dual-mode interconnection standard, the terminal has to search the WiMAX network by itself; and the terminal has to search frequency points within a range of a supported frequency band one by one until an appropriate WiMAX network is searched at a certain frequency point, wherein the appropriate WiMAX network means that the terminal receives a signal of the WiMAX network. The search process is relatively aimless, which may consume a lot of time, such that a very long time delay is caused for the terminal to re-access from the EVDO network to the WiMAX network; and, during the search period, the terminal and the network may be disconnected from each other, which lead to very bad user experience.

SUMMARY

In view of this, the main purpose of the disclosure is to provide a method and an apparatus for switching between different network standards, so that a rate of the switching between the different network standards can be increased, the user experience can be improved and the power consumption of a terminal can be reduced.

To realize the purpose above, the technical solution of the disclosure is realized as follows.

The disclosure provides a method for switching between different network standards, which comprises the following steps performed by a terminal: when switch is to be performed, sorting in a history record target cells corresponding to a source cell which the terminal is leaving, to form a search list, choosing the target cell from the search list and accessing the target cell.

The method may further comprise the following steps performed by the terminal: before the sorting in the history record the target cells corresponding to the source cell which the terminal is leaving, comparing a cell identity (ID) of the cell which the terminal is leaving with cell IDs of source cells in the history record, and determining that the cell which the terminal is leaving belongs to the source cells when the cell ID of the cell which the terminal is leaving is identical to the cell ID of one of the source cells in the history record.

The sorting in the history record the target cells corresponding to the source cell which the terminal is leaving to form the search list may comprise the following steps performed by the terminal: sorting the target cells to form the search list according to a number of times of successful switching from the source cell to the target cell; performing one or more of the following steps to sort the target cells: postponing a target cell for which a number of times of failed switching from the source cell to the target cell reaches a set value; advancing a target cell whose signal quality reaches a set advancing value, and postponing a target cell whose signal quality reaches a set postponing value; placing a target cell in which a dwell time of the terminal is less than a set time at bottom.

The method may further comprise the following step performed by the terminal: when the terminal fails to access the target cell or the terminal does not receive a signal from the target cell, when it is determined that the target cells in the search list have not all been searched, continuing to choose the next target cell to access; when it is determined that the target cells in the search list have all been searched, searching each of frequency points supported by the terminal and accessing a cell.

The placing the target cell in which the dwell time of the terminal is less than the set time at bottom may comprise: taking time from the terminal accessing the target cell to the terminal leaving the target cell as the dwell time of the terminal in the target cell, comparing the dwell time with the set time, and placing the target cell at bottom when the dwell time is less than the set time.

The method may further comprise the following step performed by the terminal: updating the history record when the terminal accesses the target cell, or the terminal fails to access the target cell, or the terminal searches each of the supported frequency points and accesses a cell.

The disclosure further provides an apparatus for switching between different network standards, wherein the apparatus comprises a receiving module and a network access module, and the apparatus further comprises: a search configuration module and a recording module; the search configuration module is configured to sort, in a history record of the recording module, target cells corresponding to a source cell which the terminal is leaving, to form a search list, to choose the target cell from the search list and to configure the receiving module; and the recording module is configured to store the history record.

The search configuration module may be further configured to compare a cell identity (ID) of the cell which the terminal is leaving with cell IDs of source cells in the history record of the recording module, and to determine that the cell which the terminal is leaving belongs to the source cells when the cell ID of the cell which the terminal is leaving is identical to the cell ID of one of the source cells in the history record.

The search configuration module may be specifically configured to sort the target cells form the search list according to a number of times of successful switching from the source cell to the target cell; and to sort the target cells according to one or more conditions as follows: to postpone a target cell for which a number of times of failed switching from the source cell to the target cell reaches a set value; to advance a target cell whose signal quality reaches a set advancing value, and to postpone a target cell whose signal quality reaches a set postponing value; and to place a target cell in which a dwell time of the terminal is less than a set time at bottom.

The search configuration module may be specifically configured to receive information of signal receiving failure sent from the receiving module or information of access refusal sent from the network access module; to continue to choose the next target cell and configure the receiving module according to information of the next target cell when it is determined that the target cells in the search list have not all been searched; to choose each of frequency points supported by the search configuration module to configure the receiving module when it is determined that the target cells in the search list have all been searched.

The apparatus may further comprise: the search configuration module is further configured to, send information of starting timing to a timing module when accessing the target cell; to send information of stopping timing to the timing module when leaving the target cell; to read a timing time of the timing module as the dwell time of the target cell, to store the dwell time in the history record of the recording module, to compare the dwell time with the set time, and to sort the target cell at bottom when the dwell time is less than the set time; the timing module is configured to receive the information of starting timing to start timing, and to receive the information of stopping timing to stop timing.

The search configuration module may be further configured to receive information of accessing a target cell or accessing a cell sent from the network access module to update the history record; and to receive the information of access refusal sent from the network access module to update the history record.

It can be seen that, by using the method and the apparatus for switching between different network standards in the disclosure, a cell with higher comprehensive factors, is such as the most times of the successful switching in the history record, less failure times, better signal quality and the like, is searched preferentially, so that the probability of the successful switching is higher to thus increase the rate of the switching between the different network standards; in addition, the search time of the terminal is shortened and the power consumption of the terminal is reduced, so that the user experience is improved.

DETAILED DESCRIPTION

The basic idea of the disclosure comprises the following steps performed by a terminal: when switch is to be performed, sorting, in a history record, target cells corresponding to a source cell which the terminal is leaving to form a search list, choosing the target cell from the search list and accessing the target cell.

Here, the history record is a record of switching between different network standards, which is stored by the terminal, and the history record includes: information of the source cell and information of a corresponding target cell during switching, and the number of times of successful switching from the source cell to the target cell; wherein the source cell is a cell which cannot keep connected with the terminal due to a weakened network signal and which the terminal leaves, and the information of the source cell includes an identity of the source cell; the target cell is a cell which provides a network signal for the terminal and keeps connected with the terminal and which the terminal accesses, and the information of the target cell includes a frequency point, a is Pseudo-Random (PN) offset and the like.

Wherein, the information of the source cell or the information of the target cell may be contents in cell broadcast information sent from the source cell or the target cell to the terminal after the terminal accesses the source cell or the target cell; the terminal, when switching from the source cell to the target cell, needs to record a switching result, which includes: the number of times of successful switching or the number of times of failure switching, the number of times of the failure switching when switching from the source cell to the target cell, signal quality, obtained by the terminal when accessing the target cell, of the target cell when switching from the source cell to the target cell each time, and a dwell time in the target cell; here, the dwell time is connection time of the terminal and the target cell; the terminal starts an internal timer when accessing the target cell and stops the internal timer when leaving the target cell, and the time obtained by the internal timer is namely the dwell time in the target cell.

Figure 1:
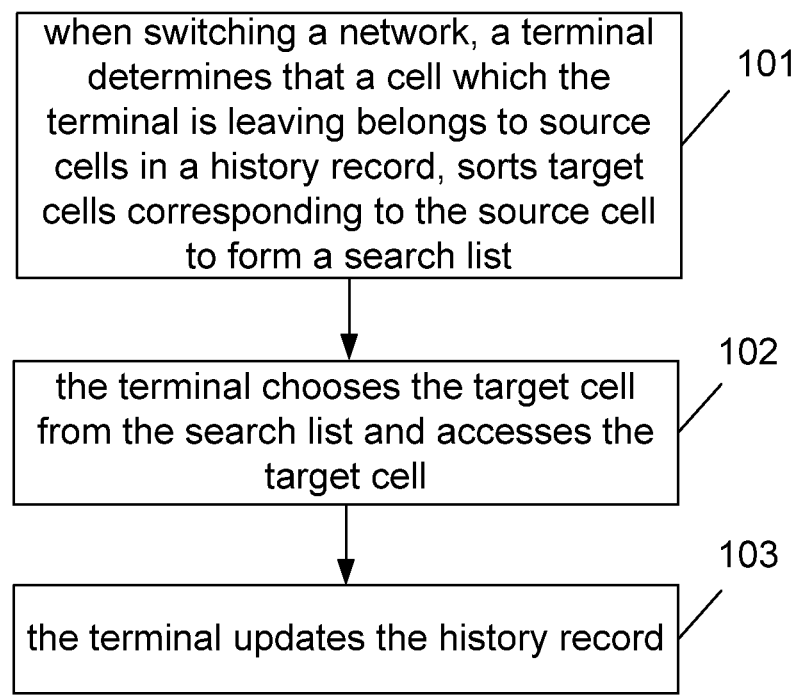
FIG. 1 is a flowchart of a method for switching between different network standards in the disclosure.

The method for switching between different network standards in the disclosure is shown as FIG. 1, and specifically includes the following steps.

Step 101: when switching a network, a terminal determines that a cell which the terminal is leaving belongs to source cells in a history record, sorts target cells corresponding to the source cell to form a search list;

here, when the terminal is located at an edge of the current network, a signal of the current network weakens, and the terminal fails to keep connected with the network and needs to leave the cell where the terminal is located currently; at the moment, the terminal determines whether the cell which the terminal is leaving belongs to the source cells in the history record, and the specific determination procedure includes: the terminal inquiries a locally-stored history record according to a cell Identity (ID) of the cell which the terminal is leaving, if there is no source cell which is identical to the cell ID of the cell which the terminal is leaving in the history record, the terminal performs switching between different network standards in the cell which the terminal is leaving for the first time, and the terminal needs to search frequency points within a range of a supported frequency band one by one according to a search method in the prior art until is the terminal receives a signal from a target cell and accesses the target cell;

if there is a source cell which is identical to the cell ID of the cell which the terminal is leaving in the history record, then it is indicated that the terminal once performed switching between different network standards in the cell which the terminal is leaving and the cell which the terminal is leaving belongs to the source cells, in other words, the cell which the terminal is leaving exists as a source cell and prior switching experience can be used for reference. The terminal, according to the history record, sorts the target cells corresponding to the source cell which is identical to the cell which the terminal is leaving, and forms the search list, and the sorting includes: the target cells are sorted based on the number of times of the successful switching from greatest to least according to the number of times of successful switching from the source cell to the target cell; the target cells can be sorted according to one or more of the following conditions: postponing the target cell for which the number of times of the failure switching from the source cell to the target cell reaches a set value;

wherein the set value of the number of times of the failure switching can be set by a user, and places by which the target cells are postponed can also be set by the user; for example, the number of times of the failure switching are within the range of 1 to 4 then the sorting is postponed by 2 places, the number of times of the failure switching are within the range of 5 to 10, then the sorting is postponed by 4 places, and so on;

advancing the target cell whose signal quality reaches a set advancing value, and postponing the target cell whose signal quality reaches a set postponing value;

wherein the set advancing value and the set postponing value are set by the user, and the places by which the target cells are advanced or postponed can also be set by the user; for example, the target cell whose signal quality is 1-2 bars are postponed by 2 places, and the target cell whose signal quality is 4-5 bars are advanced by 2 places;

comparing a dwell time of the terminal in the target cell with a set time, if the dwell time is less than the set time, the target cell is a temporary cell which is sorted at bottom; if there are more than one temporary cells, then the temporary cells are sorted from largest to least according to the number of times of the successful switching from the source cell to the temporary cells; wherein the set time can be set by the user, and the temporary cell is a cell whose signal quality is better in a very small coverage; because of the mobility of the terminal, the signal will weaken sharply after the terminal accesses a temporary cell, therefore, accessing the temporary cell should be avoided as much as possible.

Step 102: the terminal chooses the target cell from the search list and accesses the target cell.

In this step, the terminal chooses the target cell according to the sorting in the search list. Taking a first target cell as an example, information of the first target cell in the history record is read to configure a receiver of the terminal, wherein the receiver is configured to receive a cell signal according to the configuration; the receiver receives the signal from the first target cell, and the terminal sends an access request to a base station where the first target cell is located, wherein the access request includes authentication information, and the authentication information includes a PN number which is calculated and obtained by the terminal through an authentication center according to a key of the terminal; the base station receives the access request, and calculates and obtains the PN number through the authentication center according to the terminal key of the base station stored by the base station, if the PN number is identical to the PN number in the authentication information, the terminal is allowed to access; otherwise, the terminal is refused to access and the switching of the terminal fails.

If the receiver fails to receive a signal from the first target cell or the switching of the terminal fails, the terminal determines that the target cells in the search list have not all been searched and continues to search the next target cell. Taking a second target cell as an example, the search and access process is the same as that of the first target cell, and the only difference is that: the searched and accessed cell is the second target cell. Here, that the terminal determines that the search of the search list is not completed includes: the terminal compares the first target cell with the search list, if the first target cell is the cell sorted at bottom in the search list, then the target cells in the search list have been searched, and the terminal searches the frequency points within the range of is the supported frequency band one by one according to a search method in the prior art until the terminal receives a signal from a cell and accesses the cell; otherwise, the target cells in the search list have not all been searched.

Step 103: the terminal updates the history record.

In this step, the terminal accesses the target cell, or receives a signal from a cell according to a search method in the prior art and accesses the cell, and updates the history record;

wherein, the updating includes that: the terminal determines that the cell which the terminal is leaving does not belongs to source cells, then takes the cell which the terminal is leaving as the source cell and takes the accessed cell as the target cell, and adds a record of a corresponding relation between the source cell and the target cell to the history record, and the record includes: information of the source cell, information of the target cell, the number of times of successful switching from the source cell to the target cell, signal quality of the target cell and a dwell time of the terminal in the target cell;

if the cell which the terminal is leaving belongs to source cells, the terminal continues to judge whether the accessed cell belongs to target cells in the history record, if the terminal determines that the accessed cell belongs to the target cells, then the terminal adds the number of times of the successful switching from the source cell to the target cell, the signal quality of the target cell and the dwell time of the terminal in the target cell to the history record; if the terminal determines that the accessed cell does not belong to the target cells, then the terminal adds the accessed cell as the target cell of the source cell to the history record, and adds the information of the target cell, the number of times of the successful switching from the source cell to the target cell, the signal quality of the target cell, and the dwell time of the terminal in the target cell;

wherein, the step of determining whether the accessed cell belongs to the target cell sin the history record includes that: the terminal compares a cell ID of the accessed cell with cell IDs of the target cells corresponding to the source cell, if the cell ID of the accessed cell is identical to the cell ID of one of the target cells, then the accessed cell is belongs to the target cells; otherwise, the accessed cell does not belong to the target cells; further, if the switching of the terminal fails, the number of times of the failure switching from the source cell to the target cell is updated to the history record.

Figure 2:
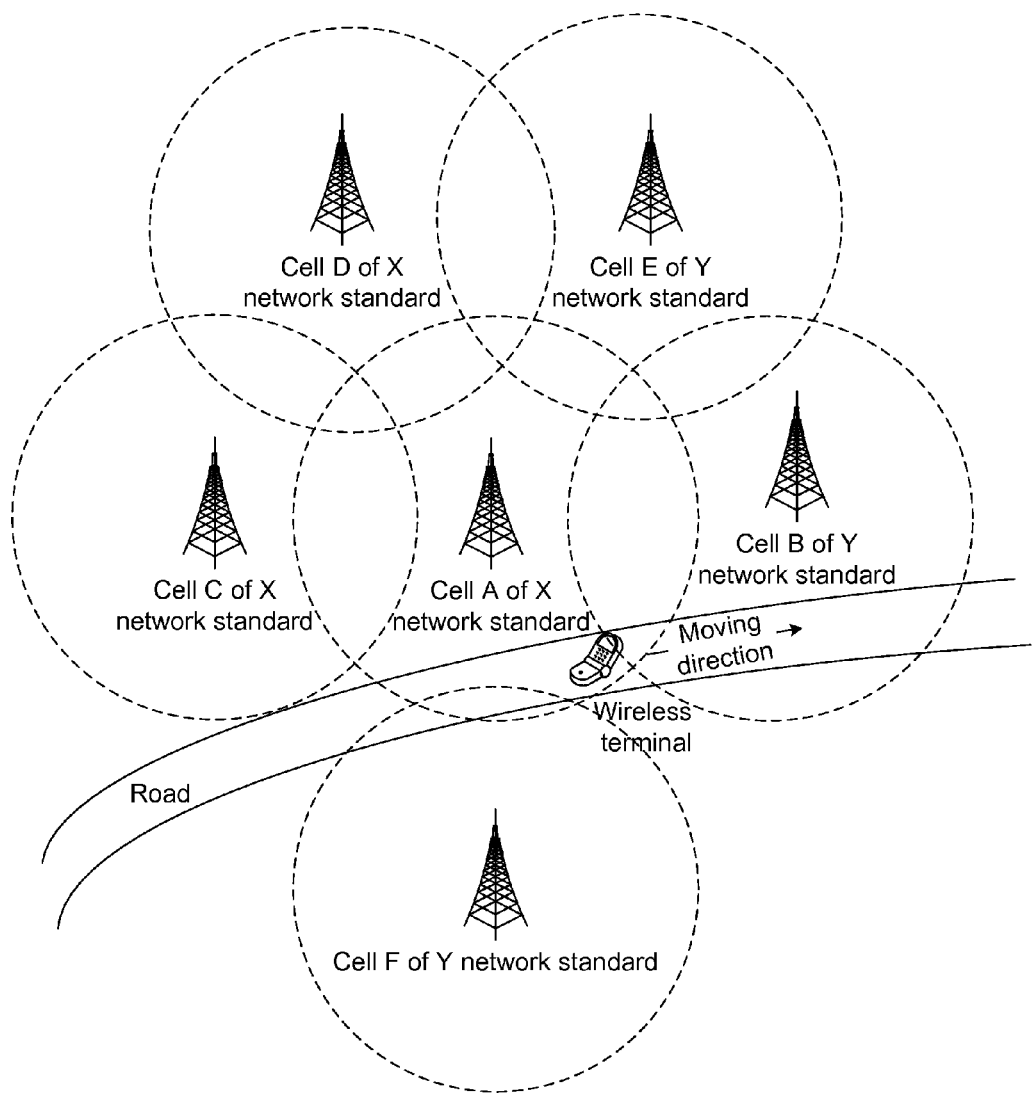
FIG. 2 is an exemplary diagram of switching between different network standards in the disclosure.

The disclosure will be described in detail according to an embodiment hereinafter. As shown in FIG. 2, provided that a cell A, a cell C and a cell D belong to an X network standard, and a cell B and a cell E belong to a Y network standard. The coverage of each cell of these cells is shown by a circle in a dashed line. A terminal moves towards the cell B along a road at the edge of the coverage of the cell A. The terminal detects that a signal of the cell A is becoming too weak to support a connection and signals of other cell of the X network standard are insufficient to support the connection; at the moment, the terminal inquires a history record stored by the terminal itself;

provided that the cell A once switched to the cells B, E of the Y network standard, that is, the cell A exists as a source cell in the history record, then the terminal sorts the target cells (i.e., the cells B, E) corresponding to the source cell (i.e., the cell A) and forms a search list;

Provided that, the number of times of the successful switching from the cell A to the cell B is 5, the signal quality is 4 bars, the dwell time is 18 minutes and the number of times of the failure switching is 1; and the number of times of the successful switching from the cell A to the cell E is 1, the signal quality is 2 bars, the dwell time is 1 minute, and the number of times of the failure switching is 2, then the sorting in the search list is the cell B, the cell E. The terminal searches the cell B for the first time, which will increase the possibilities of receiving a signal of a cell and accessing the cell to a great extent. If the terminal fails to receive the signal of the cell B or is refused to access the cell B by a base station where the cell B is located, then the terminal continues to search the cell E and access the cell E; if the terminal still fails to receive the signal of the cell E or is refused to access the cell E by a base station where the cell E is located, then the terminal searches the supported frequency points one by one according to a method in the prior art.

Figure 3:
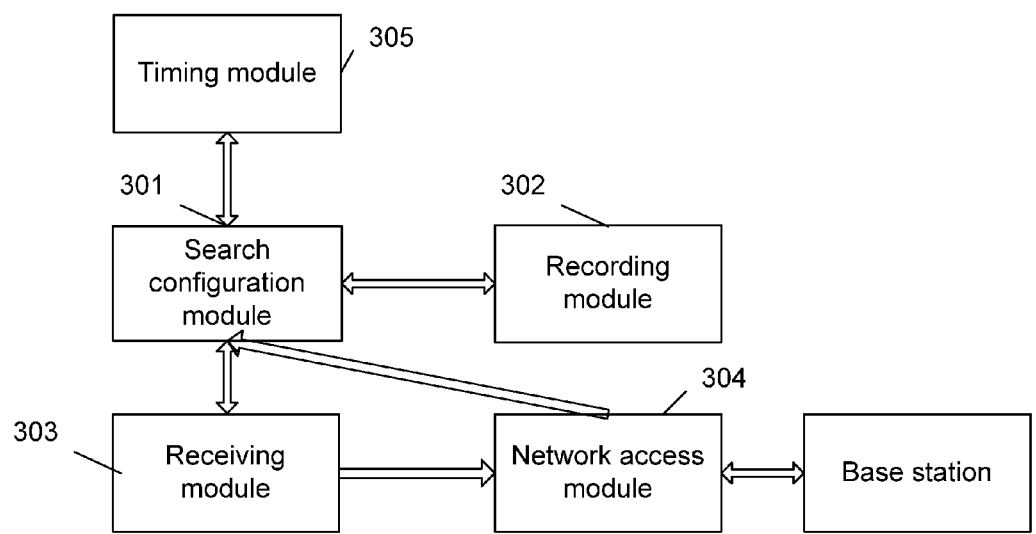
FIG. 3 is a schematic diagram of an apparatus for switching between different network standards in the disclosure.

In order to realize the method above, the disclosure further provides an apparatus for switching between different network standards, as shown in FIG. 3, the apparatus includes a search configuration module 301, a receiving module 303, a network access module 304 and a recording module 302;

the search configuration module 301 is configured to determine that a cell which the terminal is leaving belongs to source cells, sort target cells corresponding to a source cell which the terminal is leaving in a history record of the recording module 302 to form a search list, to choose information of the target cell, and to configure the receiving module 303;

the receiving module 303 is configured to, according to the configuration of the search configuration module 301, receive a signal of the target cell and to send the signal of the target cell to the network access module 304;

the network access module 304 is configured to send an access request to a base station where the target cell is located to access the target cell; and the recording module 302 is configured to store the history record.

The search configuration module 301 is further configured to compare a cell ID of the cell which the terminal is leaving with cell IDs of source cells in the history record of the recording module 302, and to determine that the cell which the terminal is leaving belongs to the source cells if the cell ID of the cell which the terminal is leaving is identical to the cell ID of one of the source cells, i.e., existing as a source cell.

The search configuration module 301 is specifically configured to, according to the number of times of successful switching from the source cell to the target cell, sort the target cells by the number of times of the successful switching from greatest to least;

The search configuration module 301 is specifically configured to sort the target cells according to one or more of the following conditions:

to postpone a target cell for which a number of times of failed switching from the source cell to the target cell reaches a set value; wherein the set value can be set by a user, and places by which the target cells are postponed can also be set by the user, for example, the number of times of the failure switching are within the range of 1 to 4 then the sorting is postponed by 2 places, the number of times of the failure switching are is within the range of 5 to 10 then the sorting is postponed by 4 places, and so on;

to advance a target cell whose signal quality reaches a set advancing value, and postpone a target cell whose signal quality reaches a set postponing value; wherein the set advancing value and the set postponing value are set by the user, and the places by which the target cells are advanced or postponed can also be set by the user, for example, the target cell whose signal quality is 1-2 bars are postponed by 2 places, and the target cell whose the signal quality is 4-5 bars are advanced by 2 places;

to compare a dwell time of the terminal in the target cell with a set time, if the dwell time is less than the set time, the target cells is a temporary cell which is sorted at bottom; if there are more than one temporary cells, then the temporary cells are sorted from largest to least according to the number of times of the successful switching from the source cell to the temporary cells; wherein the set time can be set by the user, and the temporary cell is a cell whose signal quality is better in a very small coverage; because of the mobility of the terminal, the signal will weaken sharply after the terminal accesses a temporary cell, therefore, accessing the temporary cell should be avoided as much as possible.

The receiving module 303 is further configured to, when failing to receiving the signal of the target cell, send information of signal receiving failure to the search configuration module 301; or the network access module 304 is further configured to send an access request to a base station where the target cell is located, to receive information of access grant from the base station, and to send the information of access grant to the search configuration module 301; and to receive information of access refusal from the base station and to send the information of access refusal to the search configuration module 301; the access request includes authentication information, and the authentication information includes a PN number which is calculated and obtained by the terminal through an authentication center according to a key of the terminal.

Accordingly, the base station is configured to receive the access request, to perform authentication for the terminal, if the authentication is passed, to allow the terminal to is access; otherwise, to refuse the terminal to access; the authentication includes: the base station calculates and obtains the PN number through the authentication center according to the key of the terminal stored by the base station, if the PN number is identical to the PN number in the authentication information, the authentication is passed; otherwise, the authentication fails.

The search configuration module 301 is further configured to receive the information of signal receiving failure sent from the receiving module 303 or the information of access refusal sent from the network access module 304, to continue to choose the next target cell and configure the receiving module according to information of the next target cell (i.e. the second target cell) when it is determined that the target cells in the search list have not all been searched; to choose each of frequency points supported by the search configuration module to configure the receiving module 303 when it is determined that target cells in the search list have all been searched;

here, the step of determining that the target cells in the search list have not all been searched includes: compare the first target cell with the search list, if the first target cell is the cell sorted at bottom in the search list, then target cells in the search list have all been searched; otherwise, the target cells in the search list have not all been searched.

The search configuration module 301 is further configured to receive the information of access grant sent from the network access module 304 to update the history record of the recording module 302; the updating includes: determine that the cell which the terminal is leaving does not belong to the source cells, take the cell which the terminal is leaving as a source cell and the accessed cell as a target cell, and add a record of a corresponding relation between the source cell and the target cell to the history record, and the record includes: information of the source cell, information of the target cell, the number of times of the successful switching from the source cell to the target cell, the signal quality of the target cell and the dwell time of the terminal in the target cell;

if the cell which the terminal is leaving belongs to the source cells, the terminal continues to determine whether the accessed cell belongs to the target cells in the history record, if it is determined that the accessed cell belongs to the target cells, adds is the number of times of the successful switching from the source cell to the target cell, the signal quality of the target cell and the dwell time of the terminal in the target cell to the history record; if it is determined that the accessed cell does not belong to the target cells, adds the accessed cell as the target cell of the source cell to the history record, adds the information of the target cell, the number of times of the successful switching from the source cell to the target cell, the signal quality of the target cell, and the dwell time of the terminal in the target cell;

wherein the step of determining whether the accessed cell belongs to the target cells in the history record includes: compare a cell ID of the accessed cell with cell IDs of the target cells corresponding to the source cell, if the cell ID of the accessed cell is identical to the cell ID of one of the target cells, then the accessed cell belongs to the target cells; otherwise, the accessed cell does not belong to the target cells; furthermore, if the information of access refusal sent from the network access module 304 is received, the number of times of the failure switching from the source cell to the target cell is updated to the history record.

The apparatus further includes a timing module 305;

the search configuration module 301 is further configured to access the target cell, i.e., receive the information of access grant sent from the network access module 304, to start the timing module 305, i.e., send information of starting timing to the timing module 305; to leave the target cell, i.e., receive information of leaving the target cell to the network access module 304, to stop the timing module, i.e., send information of stopping timing to the timing module 305; to read a timing time of the timing module, i.e., the dwell time, to store the dwell time in the history record of the recording module 302; to compare the dwell time with the set time, and to sort the target cell at bottom when the dwell time is less than the set time;

accordingly, the timing module 305 is configured to receive the information of starting timing to start timing; and to receive the information of stopping timing to stop timing;

the network access module 304 is configured to, when accessing the target cell, send the information of access grant to the search configuration module 301; when leaving a network coverage of the target cell, to send the information of leaving the target cell to the search configuration module 301.

The above are only preferred embodiments of the disclosure and are not intended to limit the scope of protection of the disclosure, and any modification, equivalent replacement, improvement and the like made within the spirit and principle of the disclosure should fall within the scope of protection of the disclosure.

What is claimed is:

1. A method for switching between different network standards, comprising the following steps performed by a terminal:

when switch is to be performed, sorting in a history record target cells corresponding to a source cell which the terminal is leaving, to form a search list, choosing the target cell from the search list and accessing the target cell;

before the sorting in the history record the target cells corresponding to the source cell which the terminal is leaving, further comprising: comparing a cell identity (ID) of the cell which the terminal is leaving with cell IDs of source cells in the history record, and determining that the cell which the terminal is leaving belongs to the source cells when the cell ID of the cell which the terminal is leaving is identical to the cell ID of one of the source cells in the history record.

2. The method according to claim 1, wherein the sorting in the history record the target cells corresponding to the source cell which the terminal is leaving to form the search list comprises the following steps performed by the terminal:

sorting the target cells to form the search list according to a number of times of successful switching from the source cell to the target cell;

performing one or more of the following steps to sort the target cells:

postponing a target cell for which a number of times of failed switching from the source cell to the target cell reaches a set value;

advancing a target cell whose signal quality reaches a set advancing value, and postponing a target cell whose signal quality reaches a set postponing value;

placing a target cell in which a dwell time of the terminal is less than a set time at bottom.

3. The method according to claim 2, further comprising the following step performed by the terminal:

when the terminal fails to access the target cell or the terminal does not receive a signal from the target cell, when it is determined that the target cells in the search list have not all been searched, continuing to choose the next target cell to access; when it is determined that the target cells in the search list have all been searched, searching each of frequency points supported by the terminal and accessing a cell.

4. The method according to claim 2, wherein the placing the target cell in which the dwell time of the terminal is less than the set time at bottom comprises: taking time from the terminal accessing the target cell to the terminal leaving the target cell as the dwell time of the terminal in the target cell, comparing the dwell time with the set time, and placing the target cell at bottom when the dwell time is less than the set time.

5. The method according to claim 3, further comprising the following step performed by the terminal:

updating the history record when the terminal accesses the target cell, or the terminal fails to access the target cell, or the terminal searches each of the supported frequency points and accesses a cell.

6. An apparatus for switching between different network standards, wherein the apparatus comprising a first processor and a second processor, further comprising: a third processor and a fourth processor;

the third processor is configured to sort, in a history record of the fourth processor, target cells corresponding to a source cell which the terminal is leaving, to form a search list, to choose the target cell from the search list and to configure the first processor; and the fourth processor is configured to store the history record;

wherein the third processor is further configured to compare a cell identity (ID) of the cell which the terminal is leaving with cell IDs of source cells in the history record of the fourth processor, and to determine that the cell which the terminal is leaving belongs to the source cells when the cell ID of the cell which the terminal is leaving is identical to the cell ID of one of the source cells in the history record.

7. The apparatus according to claim 6, wherein the third processor is specifically configured to sort the target cells form the search list according to a number of times of successful switching from the source cell to the target cell; and to sort the target cells according to one or more conditions as follows:
- to postpone a target cell for which a number of times of failed switching from the source cell to the target cell reaches a set value;
- to advance a target cell whose signal quality reaches a set advancing value, and to postpone a target cell whose signal quality reaches a set postponing value; and
- to place a target cell in which a dwell time of the terminal is less than a set time at bottom.

8. The apparatus according to claim 7, wherein the third processor is specifically configured to receive information of signal receiving failure sent from the first processor or information of access refusal sent from the second processor; to continue to choose the next target cell and configure the first processor according to information of the next target cell when it is determined that the target cells in the search list have not all been searched; to choose each of frequency points supported by the third processor to configure the first processor when it is determined that the target cells in the search list have all been searched.

9. The apparatus according to claim 7, wherein the apparatus further comprising:
- the third processor is further configured to, send information of starting timing to a fifth processor when accessing the target cell; to send information of stopping timing to the fifth processor when leaving the target cell; to read a timing time of the fifth processor as the dwell time of the target cell, to store the dwell time in the history record of the fourth processor, to compare the dwell time with the set time, and to sort the target cell at bottom when the dwell time is less than the set time;
- the fifth processor is configured to receive the information of starting timing to start timing, and to receive the information of stopping timing to stop timing.

10. The apparatus according to claim 8, wherein the third processor is further configured to receive information of accessing a target cell or accessing a cell sent from the second processor to update the history record; and to receive the information of access refusal sent from the second processor to update the history record.

* * * * *